(12) United States Patent
Foshag et al.

(10) Patent No.: US 11,103,889 B2
(45) Date of Patent: Aug. 31, 2021

(54) FILTER JET-DIRECTOR UNIT AND HIGH-PRESSURE NOZZLE UNIT

(71) Applicants: Siegfried Foshag, Wolfschlugen (DE); Tobias Huber, Metzingen (DE); Alfonso Stein, Reutlingen (DE)

(72) Inventors: Siegfried Foshag, Wolfschlugen (DE); Tobias Huber, Metzingen (DE); Alfonso Stein, Reutlingen (DE)

(73) Assignee: LECHLER GMBH, Metzingen (DE)

( * ) Notice: Subject to any disclaimer, the term of this patent is extended or adjusted under 35 U.S.C. 154(b) by 494 days.

(21) Appl. No.: 15/804,255

(22) Filed: Nov. 6, 2017

(65) Prior Publication Data

US 2018/0126404 A1    May 10, 2018

(30) Foreign Application Priority Data

Nov. 7, 2016  (DE) ..................... 10 2016 221 729.1

(51) Int. Cl.
| | | |
|---|---|---|
| *B05B 1/14* | (2006.01) | |
| *B05B 15/40* | (2018.01) | |
| *B05B 1/34* | (2006.01) | |
| *B05B 1/04* | (2006.01) | |
| *B01D 29/33* | (2006.01) | |
| *B21B 45/04* | (2006.01) | |
| *B21B 45/02* | (2006.01) | |
| *B21B 45/08* | (2006.01) | |

(52) U.S. Cl.
CPC .............. *B05B 15/40* (2018.02); *B01D 29/33* (2013.01); *B05B 1/042* (2013.01); *B05B 1/14* (2013.01); *B05B 1/3402* (2018.08); *B21B 45/04* (2013.01); *B05B 1/04* (2013.01); *B21B 45/0233* (2013.01); *B21B 45/08* (2013.01)

(58) Field of Classification Search
CPC ....... B05B 15/40; B05B 1/3402; B05B 1/042; B05B 1/14; B05B 1/04; B01D 29/33; B21B 45/04; B21B 45/0233; B21B 45/08
USPC ........................................................... 239/589
See application file for complete search history.

(56) References Cited

U.S. PATENT DOCUMENTS 3,510,065 A  *  5/1970  Gigantino ............... B05B 15/65
                                                        239/590
4,068,830 A  *  1/1978  Gray .................... B01F 5/0451
                                                       366/175.2
(Continued)

FOREIGN PATENT DOCUMENTS

CN        1286572 C      11/2006
CN        1305593 C      3/2007
(Continued)

OTHER PUBLICATIONS

Notice of Allowance issued in Russian Application No. 2017138444/05 dated Jul. 24, 2018 (13 pages).

(Continued)

*Primary Examiner* — Chee-Chong Lee
(74) *Attorney, Agent, or Firm* — Flynn Thiel, P.C.

(57) ABSTRACT

A filter jet-director unit for a high-pressure nozzle for descaling metal products, having a housing, wherein the housing has an entry filter, a connector end for connecting to a nozzle, a flow duct between the entry filter and the connector end, and a jet director having flow-guiding faces in the flow duct. The flow-guiding faces of the jet director at least in portions are disposed in the region of the entry filter.

20 Claims, 11 Drawing Sheets

(56) References Cited

U.S. PATENT DOCUMENTS

| | | | | |
|---|---|---|---|---|
| 4,207,202 | A | * | 6/1980 | Cole, Jr. ................. B01F 5/061 261/28 |
| 4,848,672 | A | * | 7/1989 | Matsumoto ............... B05B 1/04 239/590.5 |
| 4,875,627 | A | * | 10/1989 | Coulston ............... B05B 1/3415 239/466 |
| 5,060,869 | A | * | 10/1991 | Bekius .................... B05B 15/65 239/599 |
| 5,201,341 | A | * | 4/1993 | Saito ........................ F02D 7/02 123/557 |
| 7,367,518 | B2 | | 5/2008 | Tanigaki et al. |
| 7,841,548 | B2 | | 11/2010 | Fecht et al. |
| 7,913,937 | B2 | | 3/2011 | Kioi |
| 9,377,115 | B2 | | 6/2016 | Frick et al. |
| 2003/0052199 | A1 | | 3/2003 | Ikeuchi et al. |
| 2005/0156064 | A1 | | 7/2005 | Tanigaki et al. |
| 2008/0283635 | A1 | | 11/2008 | Fecht et al. |
| 2009/0272826 | A1 | | 11/2009 | Kioi |
| 2011/0110811 | A1 | | 5/2011 | Fecht et al. |
| 2017/0028424 | A1 | | 2/2017 | Foshag |

FOREIGN PATENT DOCUMENTS

| | | |
|---|---|---|
| CN | 200970557 Y | 11/2007 |
| CN | 101306409 A | 11/2008 |
| CN | 101579660 A | 11/2009 |
| CN | 202224459 U | 5/2012 |
| CN | 102900871 A | 1/2013 |
| DE | 91 09 175 U1 | 11/1991 |
| DE | 297 06 863 U1 | 8/1997 |
| DE | 10 2009 019 255 A1 | 11/2009 |
| DE | 10 2014 112 757 A1 | 3/2016 |
| DE | 10 2015 214 123 B3 | 7/2016 |
| EP | 1 078 692 A2 | 2/2001 |
| EP | 1 992 415 A2 | 11/2008 |
| JP | 11-319636 A | 11/1999 |
| JP | 2004-216454 A | 8/2004 |
| JP | 2010-221257 A | 10/2010 |
| JP | 2011-115749 A | 6/2011 |
| JP | 2013-121589 A | 6/2013 |
| RU | 2 258 551 C1 | 8/2005 |
| WO | WO 2005/107880 A1 | 11/2005 |

OTHER PUBLICATIONS

German Office Action issued in Appln. No. 10 2016 221 729.1 dated Jul. 7, 2017 (5 pages).

Office Action of Japanese Patent Office issued in Japanese Application No. 2017-205781 with English translation dated Dec. 27, 2018 (5 pages).

Search Report of European Patent Office issued in European Application No. 17 19 8760 with English translation of category of documents cited dated Mar. 14, 2018 (7 pages).

Office Action from Chinese Patent Office corresponding to Chinese Patent Application No. 201711084974.2, dated Sep. 26, 2019 (22 pages).

\* cited by examiner

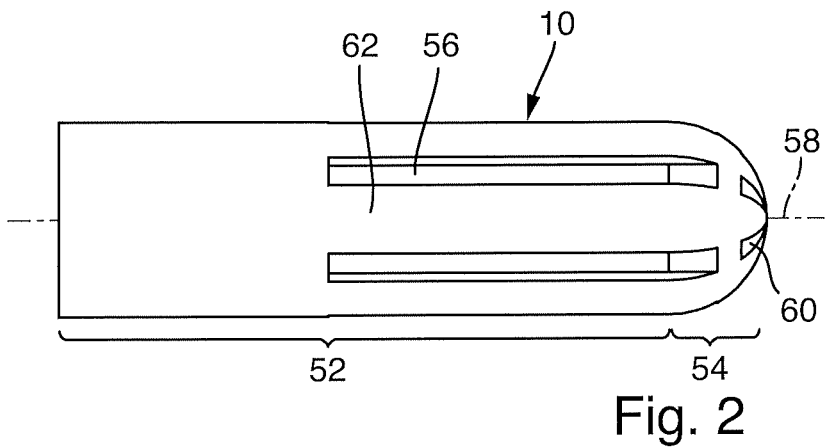
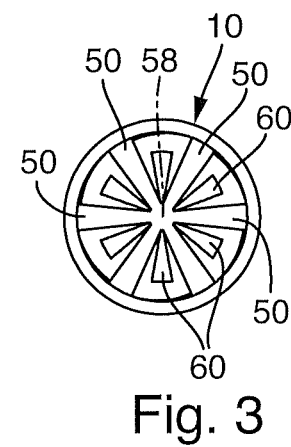
Fig. 2          Fig. 3
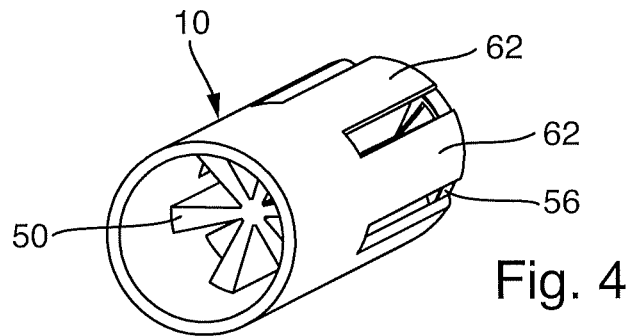
Fig. 4
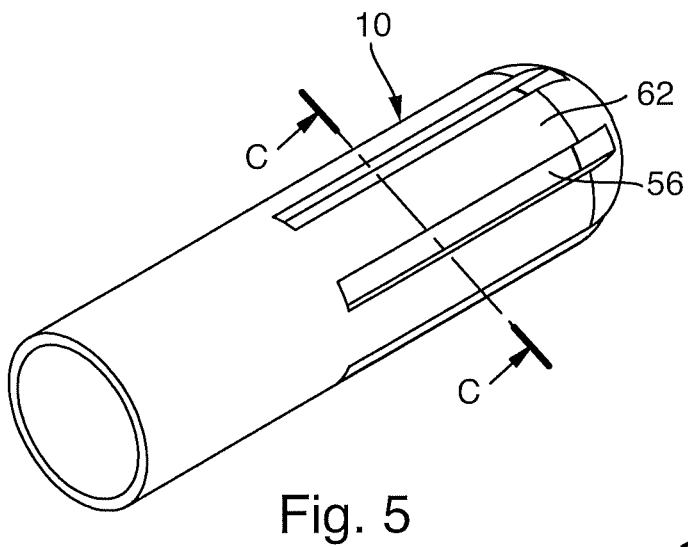
Fig. 5
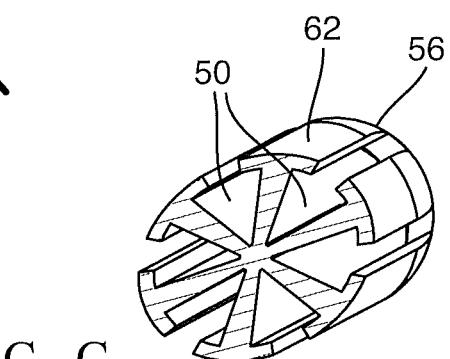
C - C
Fig. 6

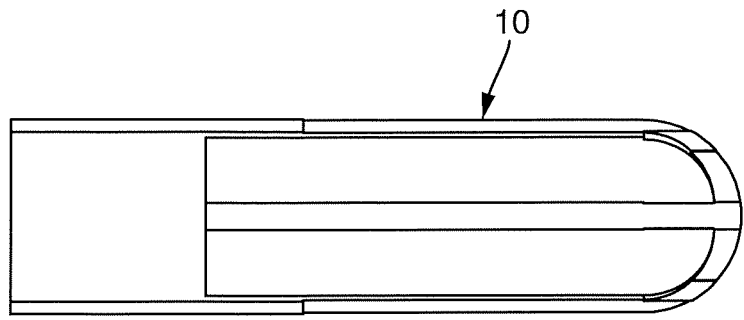
Fig. 7      Fig. 8
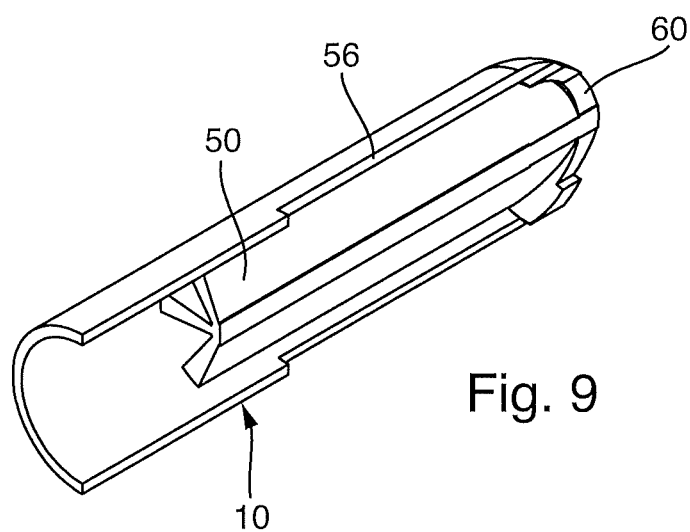
Fig. 9
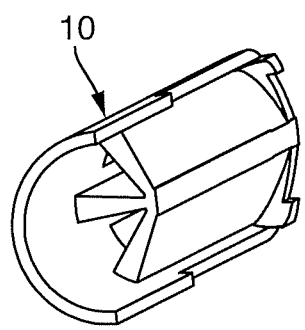
Fig. 10

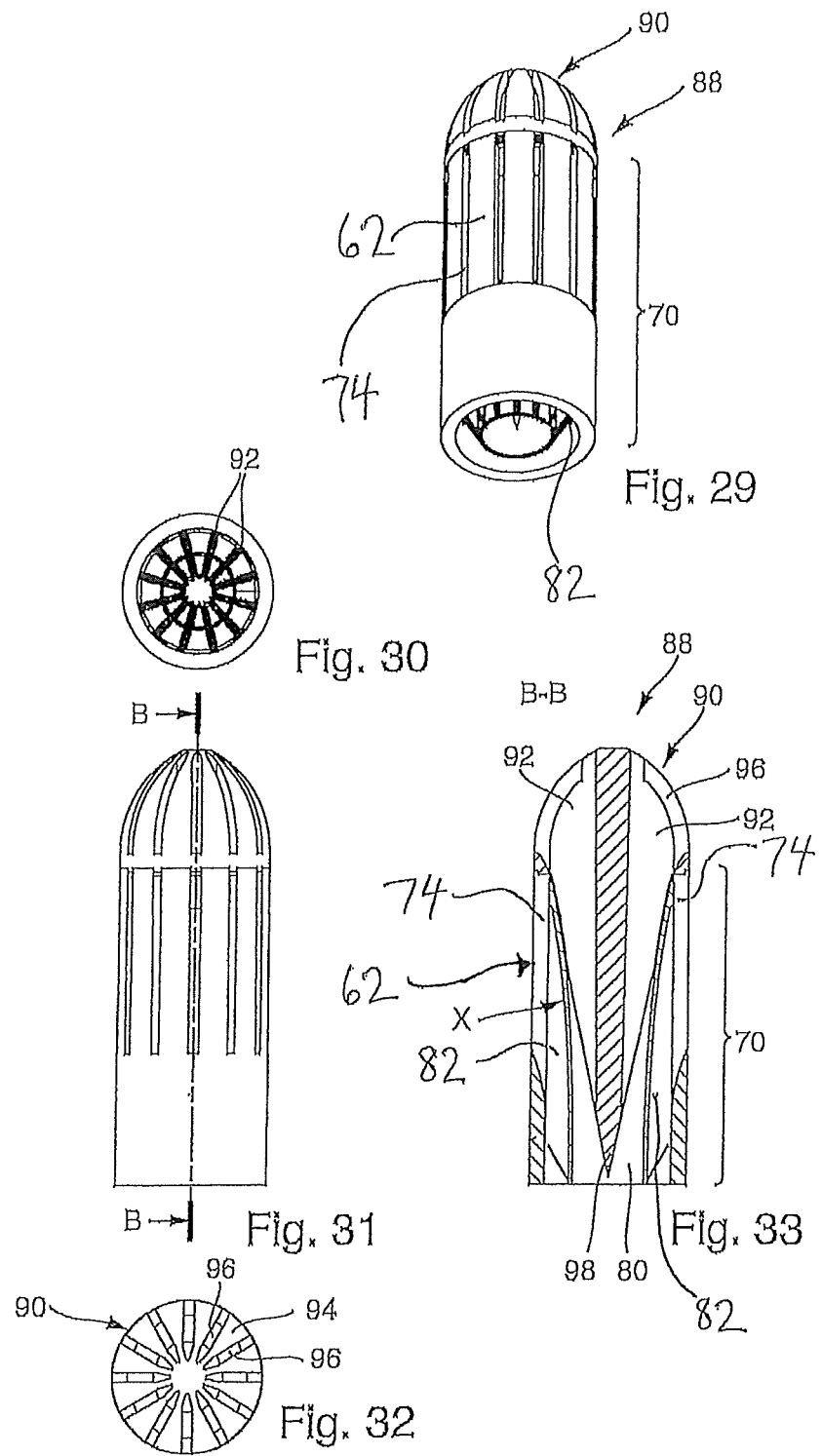

FILTER JET-DIRECTOR UNIT AND HIGH-PRESSURE NOZZLE UNIT

CROSS-REFERENCE TO RELATED APPLICATION

This claims priority from German Application No. 10 2016 221 729.1, filed Nov. 7, 2016, the disclosure of which is hereby incorporated by reference in its entirety.

FIELD OF THE INVENTION

The invention relates to a filter jet-director unit, in particular for a high-pressure nozzle, in particular for descaling metal products, having a housing, wherein the housing has an entry filter, a connector end for connecting to a nozzle, a flow duct between the entry filter and the connector end, and a jet director having flow-guiding faces in the flow duct. The invention also relates to a high-pressure nozzle unit having a filter jet-director unit according to the invention.

BACKGROUND AND SUMMARY OF THE INVENTION

A high-pressure nozzle for descaling steel products is known from the European patent publication EP 1 992 415 B1, said high-pressure nozzle having a housing having an entry filter, a nozzle mouthpiece having an exit opening, a flow duct between the entry filter and the exit opening in the nozzle mouthpiece, and a jet director having flow-guiding faces in the flow duct. The entry filter is formed by a cylindrical piece of tubing which is provided with slots that run parallel with the central longitudinal axis of the piece of tubing. The cylindrical piece of tubing is closed off by an approximately semi-spherical filter cap which is likewise provided with slots. A jet director which has a plurality of flow-guiding faces which are disposed so as to be radial to a central longitudinal axis of the flow duct through the housing is disposed downstream of the entry filter. The flow-guiding faces at the radially inward end thereof are not interconnected and on account thereof form a coreless jet director.

A further high-pressure nozzle for descaling steel products is known from the first and unexamined publication US 2005/0156064 A1. The high-pressure nozzle has a housing having an entry filter, a nozzle mouthpiece having an exit opening, a flow duct between the entry filter and the exit opening in the nozzle mouthpiece, and a jet director having flow-guiding faces in the flow duct. The entry filter is configured as a unilaterally closed off cylindrical tube, wherein slots are disposed in the circumferential wall of the cylindrical tube and in the disc-shaped termination of the cylindrical tube. A jet director which has a plurality of flow-guiding faces that extend in the radial direction is disposed in the flow duct so as to be downstream of the entry filter. An aerodynamic element to which the flow-guiding faces are connected is disposed on the radially inward edges of the flow-guiding faces, so as to be coaxial with the flow duct. The aerodynamic element at the upstream end and at the downstream end thereof has in each case a conical tip. The conical tip that is disposed on the upstream end extends into the region of the entry filter. The flow-guiding faces commence on the base of the conical tip that is disposed downstream of the entry filter. The conical tip that is disposed on the downstream end is disposed in the same manner such that the base of said tip is disposed on the downstream end of the flow-guiding faces.

A further high-pressure nozzle for descaling steel products is known from the German utility model DE 91 09 175 U1. There too, a housing having an entry filter, a nozzle mouthpiece having an exit opening, a flow duct between the entry filter and the exit opening in the nozzle mouthpiece, and a jet director having flow-guiding faces in the flow duct is provided. The jet director is disposed downstream of the entry filter.

A further high-pressure nozzle for descaling steel products is known from the German utility model DE 297 06 863 U1, said high-pressure nozzle having an entry filter and a jet director that is disposed in the flow duct so as to be downstream of the entry filter.

The Japanese patent abstract JP 2011-115749 describes a further high-pressure nozzle for descaling steel products.

A further high-pressure nozzle for descaling steel products is known from the German first and unexamined publication DE 10 2009 019 255 A1. The nozzle has a housing having an entry filter, a nozzle mouthpiece having an exit opening, a flow duct between the entry filter and the exit opening in the nozzle mouthpiece, and a jet director having flow-guiding faces in the flow duct. The jet director is subdivided into two portions, wherein the flow-guiding faces in the first and in the second portion are mutually offset in the circumferential direction. An annular space in which no flow-guiding faces are provided is disposed between the two portions.

A flat-jet nozzle having a nozzle mouthpiece having an exit opening and an exit chamber is known from the German patent publication DE 10 2014 112 757 B4, wherein a jet director is disposed directly upstream of the exit chamber. The jet director is configured as a disc and has a central passage opening and approximately triangular or circle sector-shaped passage openings which are disposed in a star-shaped manner about the central passage opening. The thickness of the jet-director disc is said to be between 1 mm and 4 mm.

The intention of the invention is to improve a filter jet-director unit and a high-pressure nozzle unit in terms of a flow resistance and stability of the entry filter.

To this end, according to the invention, a filter jet-director unit, and a high-pressure nozzle unit are provided.

According to the invention, a filter jet-director unit, in particular for a high-pressure nozzle, in particular for descaling metal products, said filter jet-director unit having a housing, is provided, wherein the housing has an entry filter, a connector end for connecting to a nozzle, a flow duct between the entry filter and the connector end, and a jet director having flow-guiding faces in the flow duct, wherein the flow-guiding faces of the jet director at least in portions are disposed in the region of the entry filter.

The arrangement of the flow-guiding faces at least in portions in the region of the entry filter surprisingly causes a pacification of the flow in the flow duct, and on account thereof an improved impact of the high-pressure nozzle that is provided with the filter jet-director unit, that is to say during operation of the nozzle results in the spray jet having more energy when impacting a surface. It is assumed that arrangement of the flow-guiding faces at least in portions in the region of the entry filter ensures that turbulences in the region of the entry filter cannot arise in the first place, or can be more rapidly dissipated, the overall flow resistance of the flow duct being reduced on account thereof. The high-pressure nozzles according to the invention are provided for spraying liquids at pressures of at least 50 bar, in particular several hundred bar, especially up to 800 bar.

In a refinement of the invention the entry filter has a plurality of entry slots which are disposed so as to be parallel with the central longitudinal axis of the flow duct, wherein the entry slots are mutually separated by means of a plurality of webs which when viewed in the circumferential direction of the housing are disposed beside one another, wherein the flow-guiding faces of the jet director at least in part are connected to the internal sides of those webs that face an interior of the housing.

Significant stabilizing of the webs and thus of the entire entry filter can be achieved in that the flow-guiding faces at least in part are connected to the internal sides of the webs. Pressure surges or pressure shocks, respectively, can arise in the supply lines to high-pressure nozzles, the former probably being created by opening the water supply. Such pressure shocks in the supply line make their way up to the entry filter and can damage the entry filter, for example in that the webs between the slots of the entry filter are pushed inward into the flow duct. When this arises, the available cross section of the entry filter is reduced on account thereof, and the filter and jet-director unit has to be replaced. The webs by means of a connection between the flow-guiding faces and the internal side of the webs can be stabilized to the extent that crushing in the case of pressure shocks no longer has to be anticipated. Moreover, a connection between the flow-guiding faces and the internal sides of the webs ensures a separation of the flows through the individual entry slots. It has been established that turbulences downstream of the entry slots of the entry filter can be prevented or reduced, respectively, on account of these measures, such that the flow resistance of the flow duct through the housing is reduced.

In a refinement of the invention, the flow-guiding faces on the radially inward side thereof at least in portions are interconnected or connected to a central connection element of the jet director.

In mechanical terms, the radially inward sides or edges, respectively, of the flow-guiding faces can then support one another or be supported on the central connection element, on account of which significant stabilizing of the entry filter is achieved. Moreover, the flow ducts that lie between the individual flow-guiding faces are mutually separated, on account of which turbulences are avoided and/or more rapidly dissipated and the flow resistance can be reduced.

In a refinement of the invention the central connection element extends only across part of the length of the jet director, and the flow-guiding faces on the radially inward sides thereof do not touch one another at the downstream end of the jet director. In this way, the available flow cross section when viewed across the length of the jet director can be enlarged since the available cross section increases along with the termination or the end, respectively, of the central connection element. The flow-guiding faces can nevertheless continue and when viewed in the flow direction can taper off towards the end of the jet director, for example.

In a refinement of the invention the central connection element is configured as a tube and forms a central inflow duct of the jet director.

By means of the central tube a further separate flow duct can be provided on account thereof through the jet director or through a portion of the jet director, respectively. This measure also contributes towards reducing the flow resistance.

In a refinement of the invention an available cross section of the tube decreases in the flow direction.

In a refinement of the invention the internal wall of the tube at the downstream end of the jet director runs parallel with a central longitudinal axis of the housing.

In a refinement of the invention the flow-guiding faces of the jet director extend across the entire length of the entry filter.

In this way, the entry filter, or the webs between the slots of the entry filter, respectively, by means of the flow-guiding faces can be stabilized on the entire length of the entry filter. Moreover, mutually separated flow ducts can be provided across the entire length of the entry filter. For example, each entry slot on the cylindrical circumferential wall of the entry filter is assigned a separate flow duct, and all entry slots in the filter cap which closes off the cylindrical portion of the entry filter at the upstream end are assigned a common flow duct. On account of these measures, turbulences in the entry filter can be reduced or are avoided, and the flow resistance is reduced.

In a refinement of the invention the entry filter has a plurality of entry slots that are disposed on a cylindrical circumferential wall of the housing and, proceeding from these entry slots, a plurality of mutually separated entry ducts which extend up to the end of the jet director are provided in the jet director.

In this way, turbulences which are caused by the merging of water entering through different entry slots can be entirely avoided. The water entering through the different entry slots can then be aligned in a parallel manner by means of the jet director, such that the individual water flows then meet in a mutually aligned manner downstream of the jet director, turbulences being reduced or avoided.

In a refinement of the invention, two entry slots or each entry slot are/is assigned in each case one separate inflow duct.

In a refinement of the invention one central inflow duct of the jet director and a plurality of external inflow ducts that surround the central inflow duct are provided.

In a refinement of the invention a filter cap of the entry filter is disposed at the upstream end of the central inflow duct.

In a refinement of the invention the filter cap has a plurality of entry slots, wherein at least partial flow-guiding faces of the jet director emanate from webs that are disposed between the entry slots.

In this way, the entry filter by means of the flow-guiding faces can be stabilized into the region of the filter cap.

In a refinement of the invention the flow-guiding faces are connected to internal sides of the webs.

In a refinement of the invention a face of the flow-guiding faces decreases when viewed in the flow direction, and the flow-guiding faces at the downstream end of the jet director terminate on a common tip.

A common tip can form a streamlined element which is then formed by the converging flow-guiding faces. On account of the reduction in the face of the flow-guiding faces in the flow direction, the flow resistance when viewed across the length of the jet director can be reduced without any trade-offs having to be made in terms of the directing effect of the jet director.

In a refinement of the invention the filter cap and the jet director that is formed by the flow-guiding faces are configured so as to be integral.

For example, the filter cap and the jet director can be integrally produced by means of producing a green body by metal-powder injection moulding and subsequent sintering. For example, a plurality of individual parts can also be conjointly sintered in order for a high-strength integral part to be produced. The production of individual parts by means of die casting is also possible, depending on the size and/or the material provided. Moreover, a subtractive production by machining is also possible.

Further features and advantages of the invention are derived from the claims and from the description hereunder of preferred embodiments of the invention in conjunction with the drawings. Individual features of the various embodiments illustrated and described herein can be combined in an arbitrary manner without departing from the scope of the invention.

BRIEF DESCRIPTION OF THE DRAWINGS

In the drawings:

FIG. 2 shows a side view of a filter jet-director unit of the high-pressure nozzle unit of FIG. 1;

FIG. 3 shows a view of the filter jet-director unit of FIG. 2 from below, counter to an envisaged flow direction;

FIG. 4 shows a view of the filter jet-director unit of FIG. 2 from obliquely below;

FIG. 5 shows a further view of the filter jet-director unit of FIG. 2 from obliquely below, from another viewing angle;

FIG. 6 shows a view onto the section plane C-C in FIG. 5;

FIG. 7 shows a side view of the longitudinally sectioned filter jet-director unit of FIG. 2;

FIG. 8 shows a view of the longitudinally sectioned filter jet-director unit of FIG. 7 from below, counter to the envisaged flow direction;

FIG. 9 shows a view of the longitudinally sectioned filter jet-director unit of FIG. 7 from obliquely above;

FIG. 10 shows a further view of the longitudinally sectioned filter jet-director unit of FIG. 7 from obliquely below, from another viewing angle;

FIG. 29 shows a filter jet-director unit for the high-pressure nozzle unit of FIG. 28 from obliquely below;

FIG. 30 shows a view of the filter jet-director unit of FIG. 29 from below;

FIG. 31 shows a view of the filter jet-director unit of FIG. 29 from the side;

FIG. 32 shows a view of the filter jet-director unit of FIG. 29 from above;

FIG. 33 shows a view onto the section plane B-B in FIG. 31;

DETAILED DESCRIPTION

Figure 1:
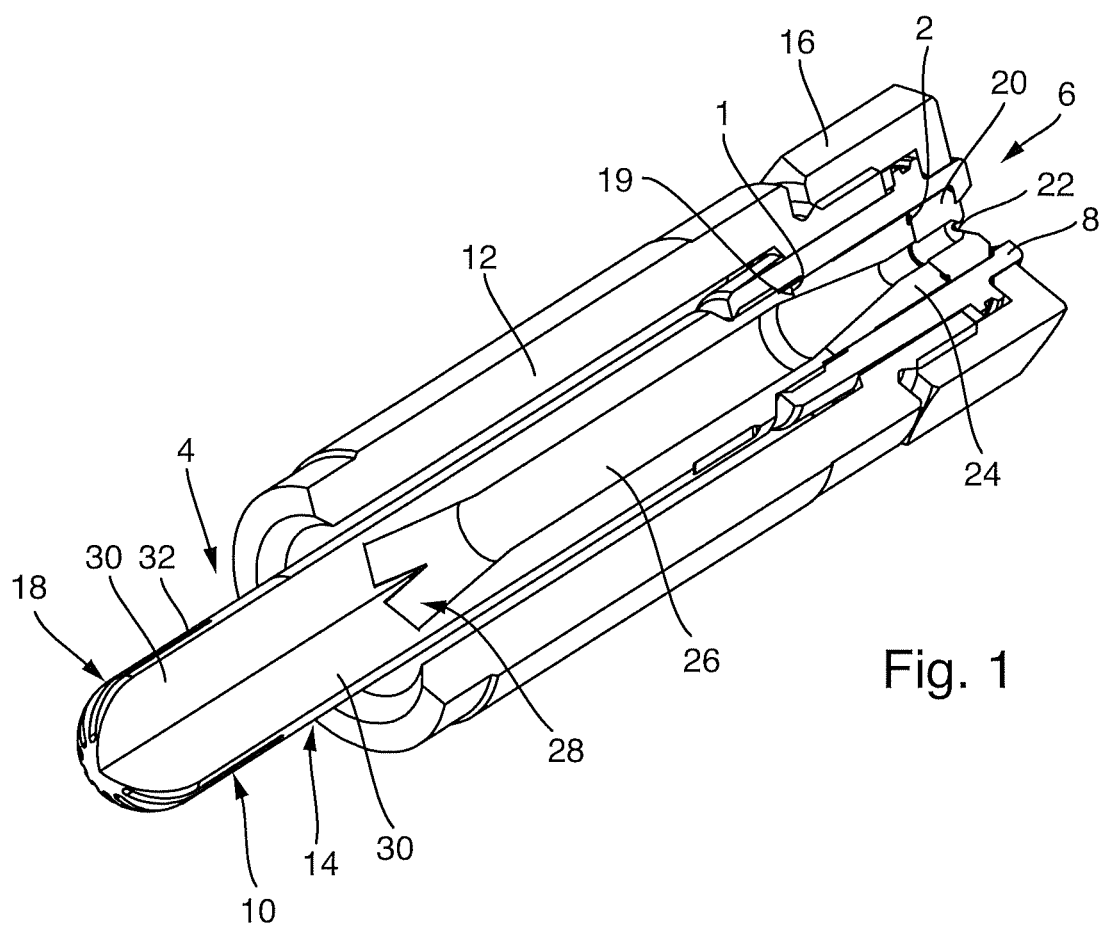
FIG. 1 shows a schematic sectional view of a high-pressure nozzle unit according to the invention.

The illustration of FIG. 1 shows a schematic sectional view of a high-pressure nozzle unit 4 according to the invention. The high-pressure nozzle unit 4 is installed in a weld-on nipple 12 which is provided for being inserted into an opening of a water-conducting pipeline (not illustrated) and to be welded thereto. The high-pressure nozzle unit 4 has a filter jet-director unit 10 and a nozzle 6. The nozzle 6 has a nozzle housing 8, a connection sleeve 24, a mouthpiece 20, and an exit opening 22. A housing 14 of the filter jet-director unit 10 is connected to the connection sleeve 24 in the region 1, and the connection sleeve 24 is connected to the mouthpiece 20 in the region 2. The housing 14 is screw-fitted into the nozzle housing 8 which by means of a union nut 16 is fastened to the weld-on nipple 12.

The housing 14 has an entry filter 18 and a connector end 19 which abuts the connection sleeve 24 and is optionally connected to the latter. A flow duct 26 runs between the entry filter 18 and the connector end 19, and then onwards to the exit opening 22. A jet director 28 which has a plurality of flow-guiding faces 30 is disposed in the flow duct. The flow-guiding faces 30 of the jet director 28 extend across the entire length of the entry filter 18 and even somewhat there beyond, as can be derived from FIG. 1. The length of the entry filter 18 herein is formed by the downstream end of slots 32 which enable water to enter the flow duct 26. The high-pressure nozzle unit 4 is provided for descaling metal products and is impinged with water at a pressure between approximately 50 bar and 800 bar.

The illustration of FIG. 2 shows a side view of the filter jet-director unit 10 of the high-pressure nozzle unit 4 of FIG. 1. The filter jet-director unit 10 has a cylindrical tube portion 52 and an approximately semi-spherical filter cap 54 which is attached to the cylindrical tube portion. The filter jet-director unit 10 in the cylindrical portion has a plurality of entry slots 56 which extend so as to be parallel with a central longitudinal axis 58 of the entry filter 18. Moreover, the entry slots 56 are disposed in the radial direction in relation to the central longitudinal axis 58, extending somewhat into the filter cap 54. Alternatively, the entry slots 56 can terminate ahead of the filter cap 54. The filter cap 54 likewise has entry slots 60 which run in the radial direction towards the penetration point of the central longitudinal axis 58 through the filter cap 54.

The illustration of FIG. 3 shows a view of the filter jet-director unit 10 from below, counter to the flow direction envisaged during operation, that is to say from the left in FIG. 2. The slots 60 in the filter cap, and a total of six flow-guiding faces 50 can be seen in this view. The flow-guiding faces 50 are connected to the internal side of webs 62 (cf. FIG. 2) which lie between entry slots 56. The flow-guiding faces 50 are interconnected by way of the radially inward edges thereof. All six flow-guiding faces 50 thus converge in the region of the central longitudinal axis 58 and are interconnected there.

The illustration of FIG. 4 shows the filter jet-director unit 10 of FIG. 2 in a view from obliquely below. The flow-guiding faces 50 of the jet director can be readily seen in this view, the former being disposed within the filter jet-director unit 10.

FIG. 5 shows a further view of the filter jet-director unit 10 from obliquely below, and FIG. 6 shows a view onto the section plane C-C in FIG. 5. It can be readily seen in FIG. 6 that the flow-guiding faces 50 are connected to the internal side of the webs 62. In the case of the embodiment of FIG. 6, the flow-guiding faces are embodied so as to be integral to the webs 62. An embodiment in multiple parts is possible in the context of the invention, and the jet directors having the flow-guiding faces can be press-fitted into the filter, for example. The flow-guiding faces 50 are interconnected on the radially inward side thereof. On account thereof, it can be readily seen in FIG. 8 that the webs 62 are stabilized by the flow-guiding faces 50. Crushing of the webs 62 in the case of pressure shocks arising in the supplied water is especially no longer to be anticipated. Such forces acting in a radially inward manner on the webs 62 are thus absorbed and dissipated by the flow-guiding faces 50.

Moreover, it can be readily seen that in each case one partial-flow duct which in the cross section is sector-like and approximately triangular and which runs continuously up to the end of the flow director and thus up to the end of the downstream flow-guiding faces 50 is formed between two flow-guiding faces 50. Each of these partial-flow ducts, which in cross section are approximately triangular, is assigned one entry slot 56 and one entry slot 60. The number of entry slots 56 and the number of entry slots 60 can be dissimilar. For example, each partial-flow duct is assigned one entry slot 56, and each second partial-flow duct is additionally assigned yet one more entry slot 60. Water entering through the respective entry slots 56 and 60 within the assigned partial-flow duct is consequently aligned between two neighbouring flow-guiding faces 50 so as to be parallel with the central longitudinal axis, and then leaves the jet director in an already aligned state. On account thereof, the individual water flows through the entry slots 56 and 60 meet one another only once in the aligned state. On account thereof, the flow resistance of the entry filter 18 can be significantly reduced as compared to conventional entry filters. As a result, a higher impact of a spray jet is achieved in the case of the high-pressure nozzle unit 4 of FIG. 1 with the filter jet-director unit 10 as compared to conventional high-pressure nozzles.

FIGS. 7 to 10 show various views of the filter jet-director unit 10 of FIG. 2, wherein only half the filter jet-director unit 10 in the illustrations of FIGS. 7 to 10 is illustrated so as to be cut open.

It can be seen in FIG. 9 that in the case of this embodiment, the partial-flow ducts which in the cross section are approximately triangular between two flow-guiding faces 50 are in each case assigned one of the entry slots 56 in the cylindrical portion of the entry filter 18, and in each case assigned one of the entry slots 60 in the dome-shaped region of the filter cap of the entry filter 18.

Figure 11:
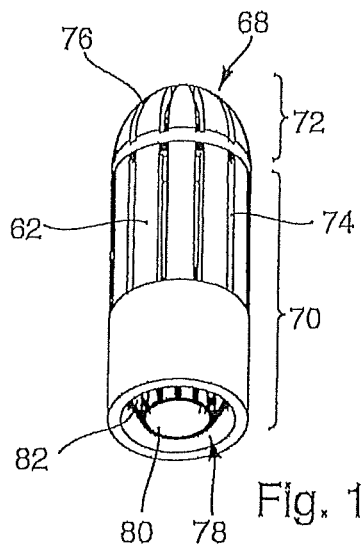
FIG. 11 shows a filter jet-director unit according to a further embodiment of the invention, from obliquely below.
Figure 12:
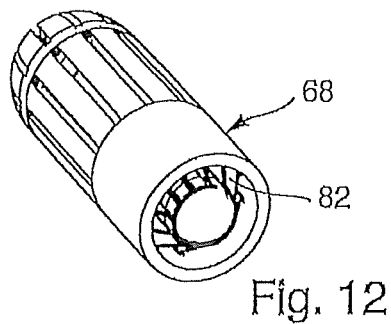
FIG. 12 shows the filter jet-director unit of FIG. 11 from another viewing angle.

The illustration of FIG. 11 shows a filter jet-director unit 68 for a further high-pressure nozzle unit according to the invention. The filter jet-director unit 68 has a cylindrical portion 70, and an approximately semi-spherical filter cap 72 that is attached to the cylindrical portion 70. A plurality of entry slots 74 which run parallel with a central longitudinal axis of the filter jet-director unit 68 are disposed in the cylindrical portion 70 so as to be distributed across the circumference. A plurality of entry slots 76 which are disposed to as to be aligned with the entry slots 74 and converge towards a penetration point of the central longitudinal axis through the filter cap 72 are also disposed so as to be distributed across the circumference in the filter cap 72. As has been discussed, a mutually aligned arrangement of the entry slots 74 and of the entry slots 76 in the filter cap 72 is not necessary in the context of the invention. The number of entry slots 74 in the cylindrical tube portion 70 can deviate from the number of entry slots 76 in the filter cap 72, and nine entry slots 76 can be provided in the filter cap 72, and twelve to fourteen entry slots 74 can be provided in the cylindrical tube portion 70, for example.

A jet director 78 is disposed within the cylindrical portion 70 of the filter jet-director unit 68. The jet director 78 has a central guide tube 80 which is disposed so as to be concentric with the central longitudinal axis and forms a central partial-flow duct. A plurality of flow-guiding faces 82 are connected to an external side of the central guide tube 80. A separate partial-flow duct is in each case formed between two flow-guiding faces 82. The flow-guiding faces 82 are in each case connected to the internal side of webs 62, wherein in each case one web 62 is disposed between two entry slots 74. Each entry slot 74 is thus assigned one separate partial-flow duct between two flow-guiding faces 82.

Figure 16:
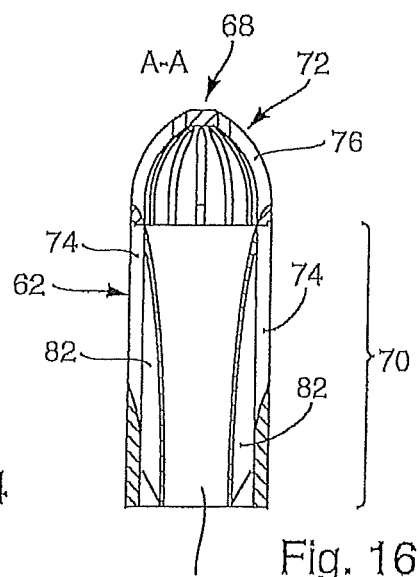
FIG. 16 shows a view onto the section plane A-A in FIG. 14.
Figure 15:
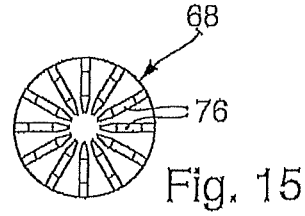
FIG. 15 shows a view of the filter jet-director unit of FIG. 11 from above.
Figure 17:
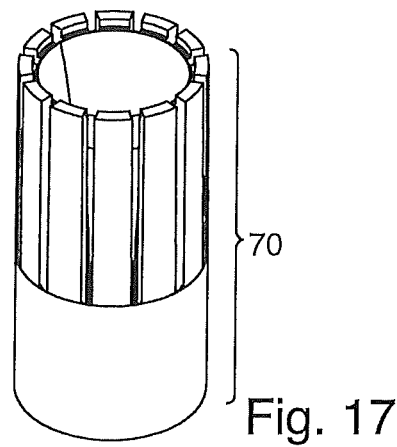
FIG. 17 shows a view of a part of the filter jet-director unit of FIGS. 11 to 16 from obliquely above.
Figure 18:
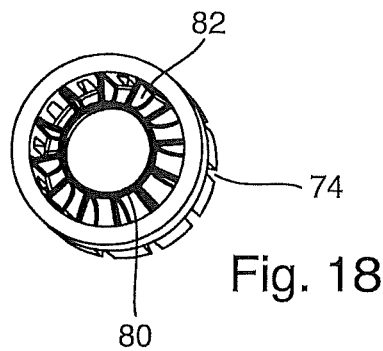
FIG. 18 shows a view of the part of the filter jet-director unit of FIG. 17 from obliquely below.
Figure 19:
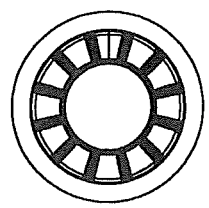
FIG. 19 shows a view of the part of the filter jet-director unit from FIG. 17 from below.
Figure 20:
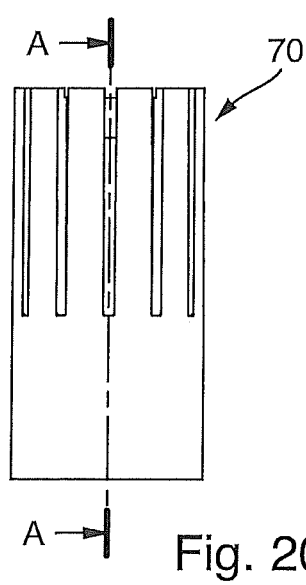
FIG. 20 shows a view of the part of the filter jet-director unit of FIG. 17 from the side.
Figure 22:
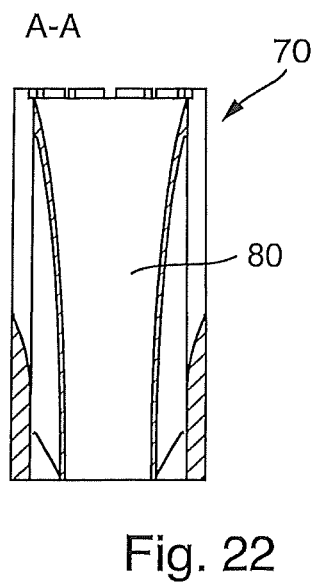
FIG. 22 shows a view onto the section plane A-A of FIG. 20.
Figure 21:
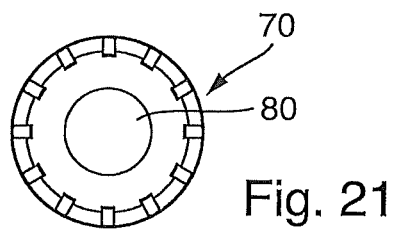
FIG. 21 shows the view of the part of the filter jet-director unit of FIG. 17 from above.
Figure 23:
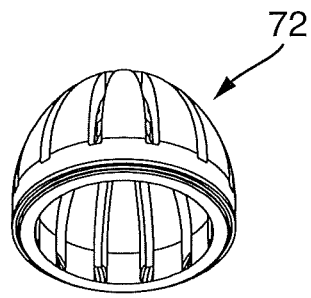
FIG. 23 shows a view of a filter cap for the filter jet-director unit of FIG. 11 from obliquely below.
Figure 24:
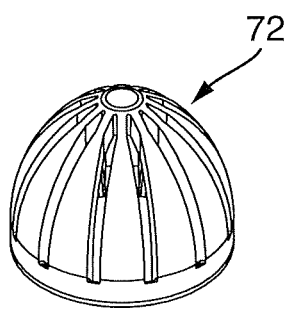
FIG. 24 shows the filter cap of FIG. 23 from obliquely above.
Figure 25:
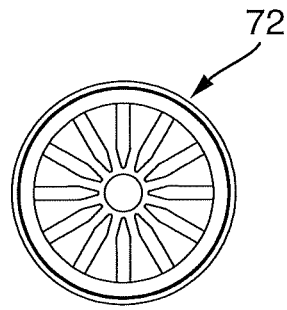
FIG. 25 shows the filter cap of FIG. 23 from below.
Figure 26:
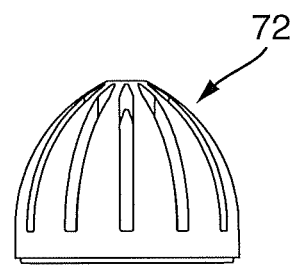
FIG. 26 shows the filter cap of FIG. 23 from the side.
Figure 27:
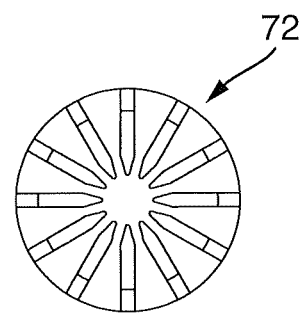
FIG. 27 shows the filter cap of FIG. 23 from above.

The arrangement of the flow-guiding faces 82 and of the slots 74 can be readily derived from the sectional view of FIG. 16. It can be seen that water entering through an entry slot 74 is guided separately in a partial-flow duct between two flow-guiding faces 82, and water entering through the filter cap 72 and then into the central guide tube 80 or through another entry slot 74 is first mixed at the downstream end of the jet director in the entry filter 68.

In the embodiment illustrated, a total of twelve radially disposed flow-guiding faces 82 and twelve entry slots 74 in the cylindrical part 70 of the entry filter 68 are provided. Twelve entry slots 76 are likewise provided in the filter cap 72.

As has been mentioned, water enters the interior of the filter cap 72 through the entry slots 76 in the filter cap 72, and then makes its way into the central guide tube 80. The central guide tube 80 commences at the upstream end of the cylindrical portion 70 and extends up to the downstream end of the cylindrical portion 70. The wall of the central guide tube 80 commences at the upstream end of the cylindrical portion 70, on the internal wall of the cylindrical portion. The available cross section of the central guide tube 80 decreases when viewed in the flow direction. This tapering is gradual, and the wall of the central guide tube 80 in the sectional view of FIG. 16 is curved towards the central longitudinal axis. The wall of the central guide tube 80 at the downstream end of the cylindrical portion 70 however is aligned so as to be parallel with the central longitudinal axis. The guide tube 80 in the context of the invention can also terminate by way of a tapered portion.

As has already been discussed, the water entering through the filter cap 72 is mixed only downstream of the flow-guiding faces 82 and downstream of the central guide tube 80 with the water entering through the entry slots 74 in the cylindrical portion 70.

Figure 13:
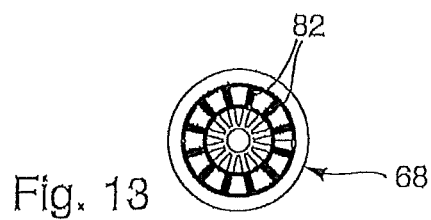
FIG. 13 shows a view of the filter jet-director unit of FIG. 11 from below, counter to the envisaged flow direction through the filter jet-director unit.
Figure 14:
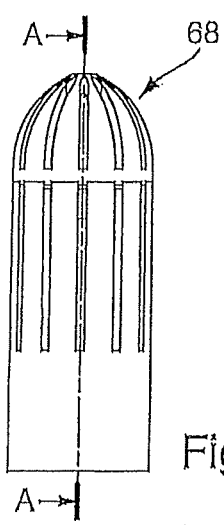
FIG. 14 shows a side view of the filter jet-director unit of FIG. 11.

It can be readily seen in the view of FIG. 16 (cf. also FIG. 13) that the flow-guiding faces 82 are connected to the internal sides of the webs 62, on account thereof stabilizing the webs 62. It does not have to be anticipated even in the event of pressure shocks that the webs 62 yield and optionally are even permanently plastically deformed. The filter cap 72 by virtue of the curved shape thereof is more stable than the webs 62 such that a deformation of the filter cap 72 in the case of pressure shocks is not to be typically anticipated in this region.

The illustrations of FIGS. 17 to 21 show various views of the cylindrical portion 70 of the entry filter 68 of FIGS. 11 to 16. For example, the arrangement of the flow-guiding faces 82 in relation to the entry slots 74, as well as the configuration of the central guide tube 80, can be more clearly seen in these views.

In order for the entry filter 68 to be produced, the cylindrical portion 70 is assembled with the filter cap 72 and is then sintered, for example.

The filter cap 72 of the entry filter 68 of FIGS. 11 to 15 is illustrated from various viewing angles in FIGS. 23 to 27.

Figure 28:
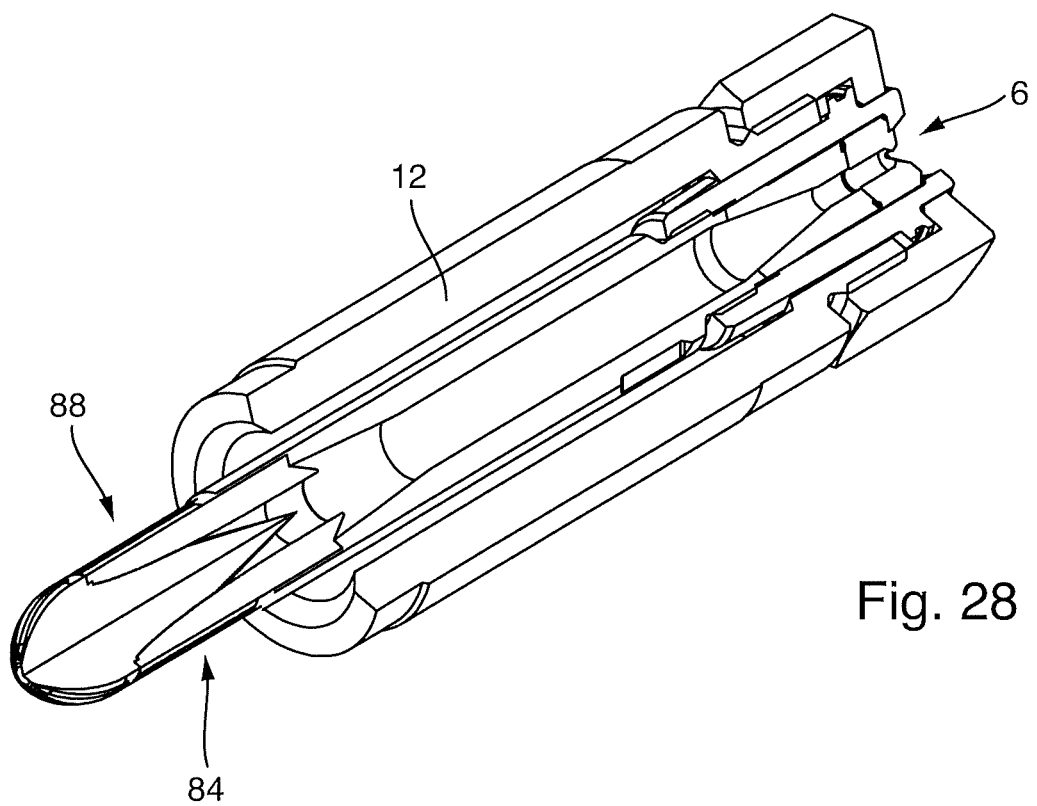
FIG. 28 shows a schematic sectional view of a further high-pressure nozzle unit according to the invention.
Figure 34:
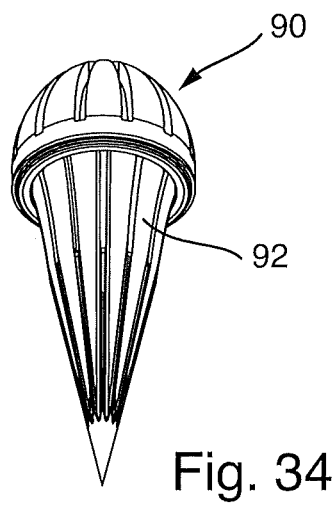
FIG. 34 shows a view of a filter cap of the filter jet-director unit of FIG. 29 from obliquely below.
Figure 35:
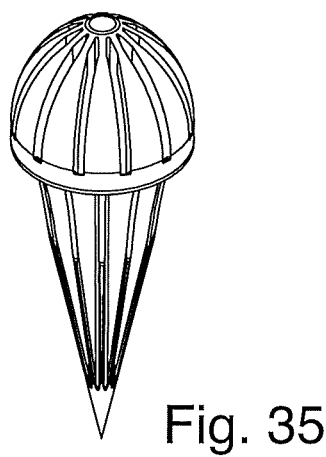
FIG. 35 shows the filter cap of FIG. 34 from obliquely above.
Figure 36:
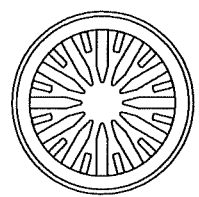
FIG. 36 shows the filter cap of FIG. 34 from below.
Figure 37:
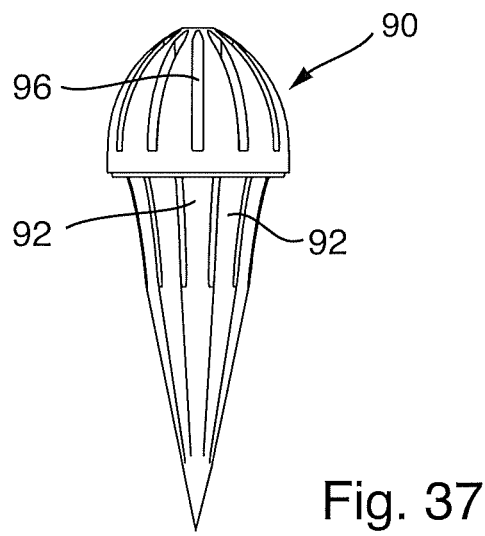
FIG. 37 shows the filter cap of FIG. 34 from the side.
Figure 38:
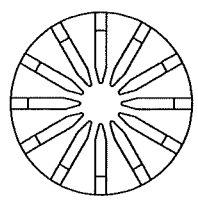
FIG. 38 shows the filter cap of FIG. 34 from above.

The illustration of FIG. 28 shows a schematic sectional view of a high-pressure nozzle unit 84 according to the invention and according to a further embodiment of the invention. The high-pressure nozzle unit 84 is again installed in the weld-on nipple 12 and has the nozzle 6 and a filter jet-director unit 88. The high-pressure nozzle unit 84 of FIG. 28 differs from the high-pressure nozzle unit 4 of FIG. 1 only in the construction of the filter jet-director unit 88 which will now be explained by means of the following FIGS. 29 to 38.

The illustrations of FIGS. 29 to 32 show the filter jet-director unit 88 of the high-pressure nozzle unit 84 of FIG. 28. The filter jet-director unit 88 has the cylindrical portion 70 which in comparison with the embodiment of FIGS. 17 to 21 is unmodified and therefore will not be explained again. The cylindrical portion 70 is assembled with a filter cap 90 which in turn is provided with a jet director and flow-guiding faces 92.

It can be seen in the sectional view of FIG. 33 that the filter cap 90 has a plurality of flow-guiding faces 92 which are disposed in planes that are radial in relation to the central longitudinal axis. The flow-guiding faces 92 are connected to the internal side of webs 94 of the filter cap 90, wherein the webs 94 are in each case disposed between two entry slots 96 of the filter cap 90. The slots 96 are disposed in the same way as the slots 76 of the filter cap 72 in FIGS. 11 to 15 and 23 to 27. The filter cap 90 of FIGS. 29 to 32 differs from the filter cap 72 only in that the flow-guiding faces 92 are provided. As can be derived from FIG. 32, a total of twelve entry slots 96 are provided in the filter cap 90, and as can be derived from FIG. 31, twelve flow-guiding faces 92 which are disposed in planes that are radial in relation to the central longitudinal axis are likewise provided. On account thereof, each of the entry slots 96 is assigned a separate partial-flow duct which runs between two neighbouring flow-guiding faces 92. The partial-flow ducts in each case have a triangular cross section. As has been discussed, the number of entry slots 96 can vary and need not be equal to the number of entry slots in the portion 70.

The flow-guiding faces 92 are interconnected by way of the radial inward edges thereof. On account thereof, an extremely stable arrangement is achieved, on the one hand, and the partial-flow ducts that are formed between the flow-guiding faces 92 are also positively separated from one another, on the other hand.

The flow-guiding faces 92 in terms of the faces thereof decrease when viewed in the flow direction, that is to say from top to bottom in FIG. 33. The shape of the flow-guiding faces 92 herein is chosen such that the filter cap 90 can be plug-fitted into the central guide tube 80 of the cylindrical portion 70. Up to the point X, and thus approximately across the length of the first third of the central guide tube 80, the flow-guiding faces 92 by way of the radially outward edge thereof still bear on the internal wall of the central guide tube 80. According to the invention, the point X at maximum is at 80% of the length of the central guide tube 80. The flow-guiding faces 92 thereafter taper so intensively that the radially outward edges thereof have a spacing from the wall of the central guide tube 80. This spacing gradually increases up to the end of the flow-guiding faces 92. As a consequence, mixing of the water from the individual partial-flow ducts between in each case two flow-guiding faces 92 is also performed in only a gradual manner.

The flow-guiding faces 92 ensure an alignment of the water entering through the slots 96 in the filter cap 90 so as to be parallel with the central longitudinal axis of the entry filter 88. At the end of the central guide tube 80, which coincides with the end of the filter jet-director unit 88, the water in the central guide tube 80 on account thereof is aligned so as to be substantially parallel with the central longitudinal axis. As has already been explained, the water then meets the water in the partial-flow ducts between the flow-guiding faces 82, the latter water being likewise aligned so as to be parallel with the central longitudinal axis. On account thereof, turbulences when mixing the flows are reduced or avoided, and an overall resistance that is lower than with conventional entry filters and jet directors can be achieved with the filter jet-director unit 88. An impact of a spray jet that exits from the high-pressure nozzle unit 84 according to the invention is increased as compared to conventional high-pressure nozzles.

As has been mentioned, the flow-guiding faces 92 run out in a common tip 98. The end of the tip 98 is located ahead of the end of the central guide tube 80. The tip 98 in the context of the invention can also be rounded and/or in the longitudinal direction be disposed ahead of, level with, or behind the end of the guide tube 80.

FIGS. 34 to 38 show the filter cap 90 of the entry filter 88 of FIGS. 30 to 34, without the cylindrical portion 70. The arrangement of the flow-guiding faces 92 can be readily seen in the various views. It can also be readily seen that each entry slot 96 in the filter cap 90 is assigned one separate partial-flow duct between two flow-guiding faces 92. In the context of the invention a plurality of entry slots 96 can also be assigned to one partial-flow duct.

The cylindrical portion 70 and the filter caps 72, 90 are in each case produced separately by metal-power injection moulding. In a manner known per se, metal powder is first mixed with a thermoplastic plastic-material binding agent. Hard-metal powder can also be used as the metal powder, for example, The mixture thus obtained is also referred to as feedstock. The mixture thus obtained in a second step is then shaped by means of injection moulding, and especially the cylindrical portion 70 and the filter cap 72, 90 are produced separately. Substantially conventional injection-moulding machines can be used since the mixture by virtue of the thermoplastic plastic-material binding agent has properties similar to those of a plastic material and is suitable for injection moulding. The precursor that is obtained after injection moulding is referred to as a green body or a green component.

A subsequent step is referred to as debinding, and the thermoplastic plastic-material binding agent is removed from the precursor by suitable processes in the course of this step. These processes can be thermal or chemical processes, for example. After debinding, a precursor having a comparatively porous structure is available in which intermediate spaces which were originally filled by the thermoplastic plastic-material binding agent are present between the individual metal-powder particles. The precursor that is obtained after debinding is also referred to as a brown body or a brown component.

Individual parts can be assembled after the debinding. In the present case the cylindrical portion 70 and the filter cap 72 or the filter cap 90 are assembled.

The precursors are then sintered in the their assembled state. Sintering is performed by way of a heat-treatment process. The material properties of the final product created after sintering are comparable to those of solid materials. The assembled individual parts, especially the filter cap 72 or the filter cap 90 and the cylindrical portion 70 can be permanently interconnected by the step of sintering, and any potential joints between the individual parts disappear herein.

Alternatively, the filter cap 72, the filter cap 90, and the cylindrical portion 70 can also be produced and sintered separately. Connecting these components is then performed by welding, in particular laser welding, or soldering/brazing, for example.

If required, the interconnected individual parts can be post-machined or surface-treated, for example, draw polished, so as to further reduce the flow resistance.

The entry filter that is produced by means of metal-powder injection moulding can be designed so as to be aerodynamic and at the same time be of high strength. The arrangement of the flow-guiding faces in the region of the entry filter and the support of the webs between the entry slots by the flow-guiding faces contribute especially towards the strength that is increased as compared to conventional entry filters. At the same time, a reduced flow resistance can be achieved by the early alignment of the water entering the entry filter by way of the flow-guiding faces, since the flow-guiding faces of the jet director extend into the region of the entry filter. This consequently leads to an improved impact of a high-pressure nozzle according to the invention that is equipped with the entry filter.

Alternatively, the filter jet-director unit according to the invention can be produced by means of die casting or selective laser melting, for example.

Figure 39:
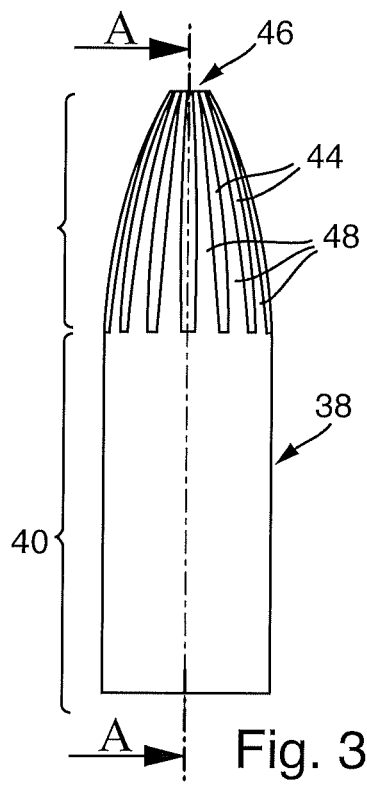
FIG. 39 shows a side view of a filter jet-director unit according to a further embodiment of the invention.

The illustration of FIG. 39 shows a filter jet-director unit 38 which can be employed instead of the filter jet-director unit 18 in the case of the high-pressure nozzle unit 4 of FIG. 1. The filter jet-director unit 38 has a cylindrical tube portion 40 and an approximately dome-shaped filter cap 42. The connector end for connecting to the nozzle is disposed at the lower end of the cylindrical tube portion 40 in FIG. 39. The filter cap 42 is provided with a plurality of entry slots 44 which run almost across the entire length of the filter cap 42 and terminate at the cusp of the filter cap on a central tube 46. The slots 44 consequently extend from the wall of the central tube 46 up to the cylindrical wall of the cylinder portion 40. The slots 44 are mutually separated by webs 48. The flow-guiding faces 34 extend from the internal sides of the webs 48 up to the external wall of the central tube 46. The flow-guiding faces 34 are connected to the internal sides of the webs 48 (cf. also FIG. 42). The central tube 46 extends to just ahead of the downstream end of the slots 44 and thus terminates even ahead of where the cylindrical portion 40 of the filter jet-director unit 38 commences. By contrast, the flow-guiding faces 34 extend into the cylindrical portion 40 of the entry filter 38, wherein however the face of the flow-guiding faces 34 gradually decreases in the flow direction, that is to say from top to bottom in FIGS. 39 and 42. The flow-guiding faces 34 terminate ahead of the end of the cylindrical portion 40. The tapering of the flow-guiding faces 34 and the resulting reduction in the face in the flow direction is achieved by a sweeping curved contour of the radially inward edge of the flow-guiding faces 34 in the portion downstream of the central tube 46. On account thereof, the radially inward edges of the flow-guiding faces 34 run so as to steadily diverge so as to finally open into the internal wall of the cylindrical portion 40. The central tube 46 forms a partial-flow duct, and in each case one further partial-flow duct of the entry filter 38 is configured between in each case two flow-guiding faces 34.

Figure 40:
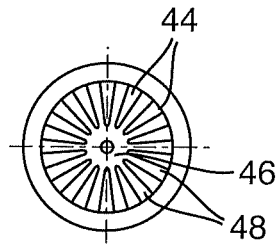
FIG. 40 shows a view of the filter jet-director unit of FIG. 39 from below, counter to the flow direction envisaged during operation.

FIG. 40 shows a view of the filter jet-director unit 38 of FIG. 39 from above, and FIG. 40 shows a view from below.

Figure 42:
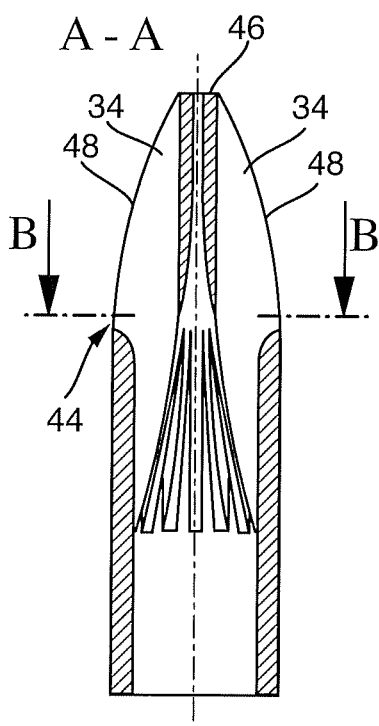
FIG. 42 shows a view onto the section plane A-A in FIG. 39.

The illustration of FIG. 42 shows a view onto the section plane A-A in FIG. 39. The flow-guiding faces 34 which in each case emanate from the internal side of the webs 48 can be seen. In each case one slot 44 is disposed between two webs 48. It can be furthermore seen that the flow-guiding faces 34 run up to the central tube 46 and by way of the radially inward edges of said flow-guiding faces 34 are connected to the external wall of the central tube 46.

Figure 43:
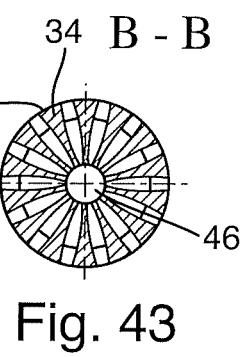
FIG. 43 shows a view onto the section plane B-B in FIG. 42.
Figure 41:
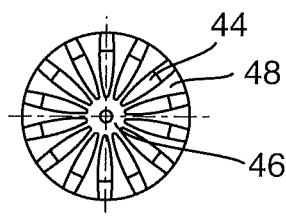
FIG. 41 shows a view of the filter jet-director unit of FIG. 39 from above.

FIG. 43 shows a view onto the section plane B-B in FIG. 42. The flow-guiding faces 34 on the internal side of the webs 48 occupy the entire width of the webs 48 and then said flow-guiding faces 34 in terms of the width thereof decrease in the direction towards the central tube 46. A partial-flow duct through which water can enter the region that directly surrounds the central longitudinal axis of the entry filter 38 is likewise configured within the central tube 46.

Figure 44:
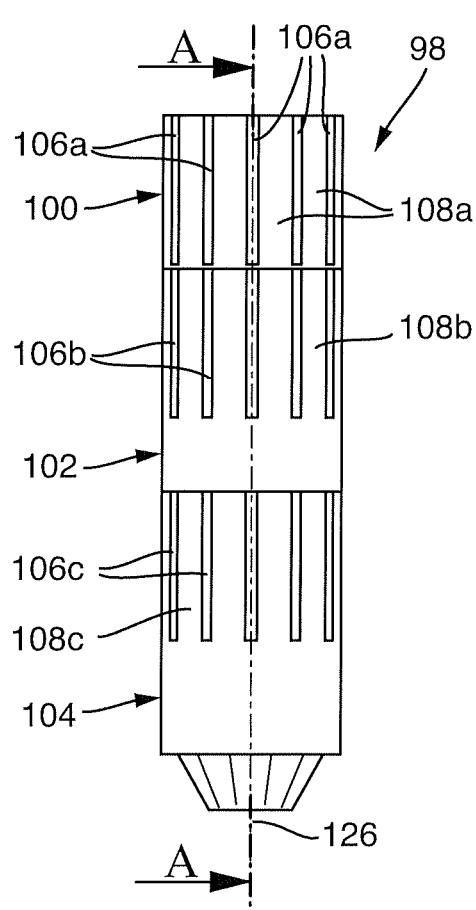
FIG. 44 shows a view of a filter jet-director unit according to a further embodiment of the invention.

The illustration of FIG. 44 shows a filter jet-director unit 98 according to a further embodiment of the invention. The filter jet-director unit 98 has a total of three portions 100, 102, 104 which are produced as separate components and are interconnected, for example by conjoint sintering, soldering/brazing, or else welding. Each of the portions 100, 102, 104 has parts of the entry filter and parts of the jet director. The portion 100 that is disposed at the upstream end thus has a cylindrical shape having a planar end face and a plurality of entry slots 106a which are disposed in the radial direction. The entry slots 106a extend along the cylindrical circumferential wall so as to be parallel with the central longitudinal axis 126, and also extend into the planar end face of the portion 100. Webs 108a are disposed in each case between the entry slots 106a. The location and configuration of the webs 108a can also be seen in the sectional view of FIG. 45 on the section plane A-A in FIG. 44. Flow-guiding faces 110 emanate from an internal side of the webs 108a. The flow-guiding faces 110 converge in the centre of the portion 100 and consequently form a rod-shaped central element 112 therein. The rod-shaped central element 112 emanates from the planar end side of the portion 100 and extends beyond the cylindrical circumferential wall. The flow-guiding faces 110 taper in the flow direction from the end of the cylindrical circumferential wall. The flow-guiding faces 110 in terms of the face thereof decrease gradually to zero, this being the case just ahead of an end 114 of the central component 112. The end 114 of the central component 112 is embodied as a rounded tip. The central element 112 and the flow-guiding faces 110 extend into the second portion 102.

The second portion 102 is also provided with entry slots 106b that are distributed across the circumference of the former. The entry slots 106b in the second portion 102 when viewed in the longitudinal direction of the filter jet-director unit 98 are aligned with the entry slots 106a of the first portion 100; however, said entry slots 106b in the context of the invention can also comprise a different number and/or can be offset. The second portion 102 is provided with a cylindrical circumferential wall in which the slots 106b are configured. The second portion 102 moreover has a central tube 116 (cf. FIG. 45) which tapers in the flow direction, the central element 112 and the flow-guiding faces 110 of the first portion 100 extending into said central tube 116. Flow-guiding faces 118 which, similar to those of the embodiment of FIGS. 14 and 16, form a plurality of partial-flow ducts, emanate from an external wall of the central tube 116. Especially in the case of the embodiment illustrated, each entry slot 106b in the second portion 102 is assigned one partial-flow duct between two flow-guiding faces 118. As has already been discussed, the assignation of the entry slots 106b to the partial-flow ducts can be different, and two or three entry slots 106b can be assigned to one partial-flow duct, for example. The central element 112 extends into the central tube 116 of the second portion 102 so far that the end 114 of the central element 112 is disposed so as to be approximately level with the end of the cylindrical circumferential wall of the second portion 102. The central tube 116 extends beyond the end 114 of the central element 112 and beyond the end of the cylindrical circumferential wall of the second portion 102, and protrudes into a central tube 120 of the third portion 104.

The third portion 104 in terms of construction is similar to that of the second portion 102 and is only slightly longer. The central tube 120 tapers in the flow direction and at the downstream end 122 thereof then forms the downstream end of the filter jet-director unit 98. The third portion 104 has a cylindrical circumferential wall in which a plurality of entry slots, 106c are disposed. The entry slots 106c are aligned with the entry slots 106a, 106b of the first portion 100 and of the second portion 102, wherein the entry slots 106c of the third portion 104 can be offset in relation to the entry slots 1061, 106b of the portions 100, 102, or else can be present in different numbers, as has been discussed. The entry slots 106a, 106b, 106c of the different portions 100, 102, 104 open into different partial-flow ducts. Flow-guiding faces 124 are thus also disposed in the case of the third portion 104 between the webs 108c which mutually separate the entry slots 106c and the external wall of the central tube 120. In each case one partial-flow duct is then disposed between two flow-guiding faces 124. To this extent, the third portion in terms of construction is in principle identical to that of the second portion 102 and differs only in terms of the length of said third portion, as has been discussed.

Figure 45:
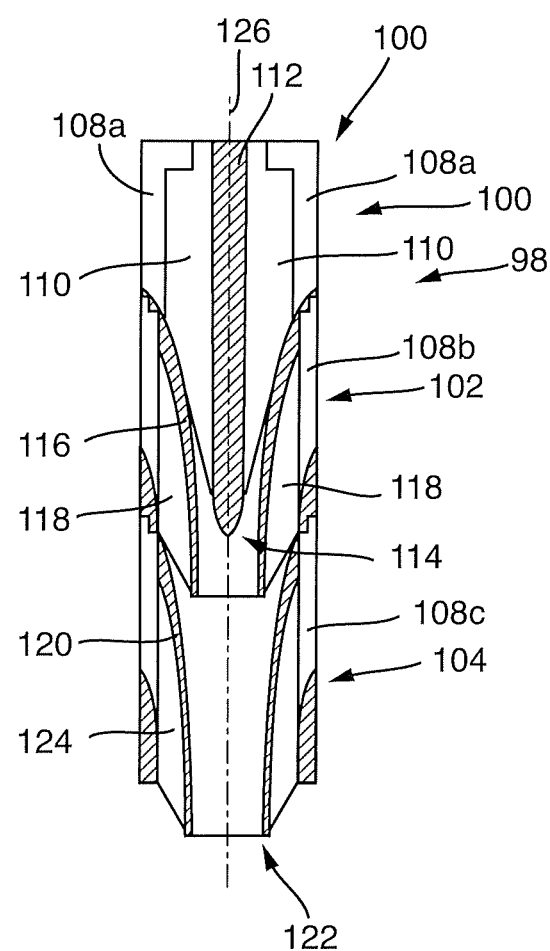
FIG. 45 shows a view onto the section plane A-A in FIG. 44.

It can also be seen in the sectional view of FIG. 45 that the respective downstream borders of the entry slots 106a, 106b, 106c in all three portions 100, 102, 104 are embodied so as to be rounded and substantially parallel with the contour of the central tubes 116, 120. This also avoids the creation of turbulences.

The filter jet-director unit 98 has an identifiable modular construction. For example, a filter jet-director unit could be formed only by means of the first portion 100 and of the second portion 102, or by means of the first portion 100 and of the third portion 104. It would likewise be possible for the first portion 100 to be provided with two successive portions 102 and then still with the third portion 104, for example, if a comparatively long filter jet-director unit is required. It is essential herein that partial-flow ducts which open into the central tube 116 of the second portion 102, or of the subsequent portion, respectively, emanate from the entry slots 106a of the first portion 100 which always forms the upstream end of the filter jet-director unit 98. The central tube 116 of the second portion 102 then in a coaxial manner opens again into the central tube 102 of the third portion 104, or of the subsequent portion, respectively. Partial-flow ducts which are formed between in each case two flow-guiding faces 118 or 124, respectively, which emanate from the entry slots 106b, 106c of the second portion 102, or of the third portion 104, respectively, open out about the central tube 116, 120 of the second portion 102, or of the third portion 104, respectively. On account thereof, the water flowing into the filter jet-director unit 98 through the entry slots 106a, 106b, 106c in the three portions 100, 102, 104 is aligned in a comparatively turbulence-free manner so as to be parallel with the central longitudinal axis 126 of the filter jet-director unit 98, and is then routed onwards to the nozzle. On account thereof, the filter jet-director unit 98 can ensure lower flow losses and a higher impact of the nozzle.

The invention claimed is:

1. A filter jet-director unit for a high-pressure nozzle for descaling metal products, the filter jet-director unit having a housing, wherein the housing has an entry filter, a connector end configured for connecting to a nozzle, and a flow duct between the entry filter and the connector end, the filter jet-director unit further including a jet director having flow-guiding faces in the flow duct and a tubular central connection element disposed to define a central part of the flow duct, wherein portions of the flow-guiding faces of the jet director are disposed in a region of the entry filter, the flow-guiding faces being disposed in surrounding relation with an external side of the central connection element and having radially inner ends connected to the external side of the central connection element.

2. The filter jet-director unit according to claim 1, wherein the entry filter has entry slots which are disposed so as to be parallel with a central longitudinal axis of the flow duct, wherein the entry slots are mutually separated by webs disposed circumferentially adjacent one another along a circumference of the housing, the webs having respective internal sides facing an interior of the housing, and radially outer ends of the flow-guiding faces of the jet director are connected to the internal sides of the webs.

3. The filter jet-director unit according to claim 1, wherein the entry filter is oriented at an upstream end of the filter jet-director unit and the connector end is oriented at a downstream end of the filter jet-director unit and fluid travels in a flow direction through the filter jet-director unit in a direction from the upstream end towards the downstream end, and an available cross section of the central part of the flow duct of the central connection element decreases in the flow direction.

4. The filter jet-director unit according to claim 3, wherein the central connection element includes a tubular wall including the external side of the central connection element, the tubular wall having an internal side facing away from the external side thereof, and the internal side at a downstream end of the jet director runs parallel with a central longitudinal axis of the housing.

5. The filter jet-director unit according to claim 1, wherein the entry filter has entry slots disposed in a cylindrical circumferential wall of the housing and in communication with the flow duct, and, proceeding from the entry slots, a plurality of external partial-flow ducts are provided in the jet director immediately adjacent the external side of the central connection element, the plurality of external partial-flow ducts being separate from one another and defining respective external parts of the flow duct.

6. The filter jet-director unit according to claim 5, wherein the plurality of external partial-flow ducts extend up to an end of the jet director.

7. The filter jet-director unit according to claim 5, wherein the external parts of the flow duct surround the central part of the flow duct defined by the central connection element.

8. The filter jet-director unit according to claim 7, further including a filter cap forming part of the entry filter, the filter cap being disposed at an upstream end of the central part of the flow duct.

9. The filter jet-director unit according to claim 8, wherein the filter cap has cap entry slots and webs, each of the webs being disposed between an adjacent pair of the cap entry slots, the filter cap including flow-guiding faces forming part of the jet director and projecting from the webs.

10. The filter jet-director unit according to claim 9, wherein the flow-guiding faces of the filter cap project inwardly from and are connected to internal sides of the webs.

11. The filter jet-director unit according to claim 9, wherein the entry filter is oriented at an upstream end of the filter jet-director unit and the connector end is oriented at a downstream end of the filter jet-director unit and fluid travels in a flow direction through the filter jet-director unit in a direction from the upstream end towards the downstream end, wherein a face of each of the flow-guiding faces of the filter cap decreases in the flow direction, and the flow-guiding faces of the filter cap at a downstream end of the jet director terminate at a common tip.

12. The filter-jet director unit according to claim 8, wherein the filter cap includes cap entry slots which open into an interior of the filter cap and communicate with the center part of the flow duct.

13. The filter-jet director unit according to claim 5, wherein each external part of the flow duct is defined between an adjacent pair of the flow-guiding faces.

14. The filter-jet director unit according to claim 13, wherein each external part of the flow duct is defined by respective surfaces of the adjacent pair of the flow-guiding faces and the external side of the central connection element disposed between the radially inner ends of the adjacent pair of the flow-guiding surfaces, the flow guiding-faces and the external parts of the flow duct are disposed in surrounding relation with the central connection element, and the central connection element is disposed within an interior of the housing.

15. A high-pressure nozzle unit for descaling metal products, the high-pressure nozzle unit having a filter jet-director unit according to claim 1, wherein a nozzle, having an entry opening and being connected to the connector end of the filter jet-director unit, is provided.

16. The high-pressure nozzle unit according to claim 15, wherein a nozzle mouthpiece of the nozzle is made from metal.

17. A filter jet-director unit for a high-pressure nozzle for descaling metal products, the filter jet-director unit comprising:
an upstream end and a downstream end, wherein fluid travels in a flow direction through the filter jet-director unit in a direction from the upstream end towards the downstream end;
an elongate housing defining a longitudinal axis and having an entry filter disposed adjacent the upstream end of the filter jet-director unit, a connector end disposed at a downstream end of the filter jet-director unit and configured for connecting to a nozzle, and a housing wall enclosing an interior of said housing in which a flow duct is disposed between the entry filter and the connector end, the housing wall having an inner surface; and
a jet director including:
a guide tube disposed within the interior of the housing and having an inner surface defining an inner part of the flow duct and an outer surface facing the inner surface of the housing wall and facing away from the inner surface of the guide tube; and
flow-guiding faces disposed in the flow duct and having respective radially inner ends connected to the outer surface of the guide tube and radially outer ends connected to the inner surface of the housing wall such that the flow-guiding faces extend radially between and interconnect the guide tube and the housing wall, portions of the flow-guiding faces being disposed adjacent the entry filter, the flow-guiding faces being disposed to define outer parts of the flow duct separate from the inner part thereof.

18. The filter jet-director unit according to claim 17, wherein the entry filter includes entry slots extending through the housing wall and in fluid communication with the flow duct, each of the entry slots opening inwardly into the interior of the housing between two adjacent ones of the flow-guiding faces, each adjacent pair of the flow-guiding faces together defining one of the outer parts of the flow duct, the outer parts of the flow duct being disposed in surrounding relation with the outer surface of the guide tube and the inner part of the flow duct.

19. The filter jet-director unit according to claim 18, wherein the entry filter includes a filter cap disposed at an upstream end thereof, the filter cap including cap entry slots in fluid communication with the inner part of the flow duct.

20. The filter jet-director unit according to claim 19, wherein the filter cap includes flow-guiding faces, each of the cap entry slots opening inwardly into an interior of the filter cap between two adjacent ones of the flow-guiding faces thereof.

* * * * *